(12) United States Patent  (10) Patent No.: US 8,317,148 B2
Ernst et al.  (45) Date of Patent: Nov. 27, 2012

(54) WALL MOUNTABLE HOLDER SYSTEM

(75) Inventors: Richard J. Ernst, San Diego, CA (US);
John P. Grimm, Santee, CA (US);
Mark E. Gonciarz, South Elgin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 666 days.

(21) Appl. No.: 12/395,286

(22) Filed: Feb. 27, 2009

(65) Prior Publication Data

US 2010/0219308 A1    Sep. 2, 2010

(51) Int. Cl.
*A47G 1/16* (2006.01)

(52) U.S. Cl. .................. 248/304; 248/223.41; 248/475.1

(58) Field of Classification Search .............. 248/216.1, 248/216.4, 217.1, 217.2, 217.3, 217.4, 475.1, 248/223.41, 224.51, 224.61, 220.21, 301, 248/304
See application file for complete search history.

(56) References Cited

U.S. PATENT DOCUMENTS

| | | | |
|---|---|---|---|
| 2,883,720 A | 4/1959 | Hansen | |
| 3,641,866 A | 2/1972 | Mortensen | |
| 4,124,189 A | 11/1978 | Einhorn | |
| 4,441,619 A | 4/1984 | Gibitz | |
| 4,601,625 A | 7/1986 | Ernst et al. | |
| 4,708,552 A * | 11/1987 | Bustos et al. | 411/80.1 |
| 4,763,456 A | 8/1988 | Giannuzzi | |
| 4,892,429 A | 1/1990 | Giannuzzi | |
| 4,923,159 A * | 5/1990 | Wang et al. | 248/205.3 |
| 5,039,262 A | 8/1991 | Giannuzzi | |
| 5,069,411 A | 12/1991 | Murphy | |
| 5,160,225 A | 11/1992 | Chern | |
| 5,190,425 A | 3/1993 | Wieder et al. | |
| 5,234,299 A | 8/1993 | Giannuzzi | |

(Continued)

FOREIGN PATENT DOCUMENTS

DE    040 16 724    11/1991

(Continued)

OTHER PUBLICATIONS

International Searching Authority (ISA/EP) PCT Notification of Transmittal, The International Search Report and The Written Opinion for International Application PCT/US2010/054968; Mailing Date Jan. 25, 2011; 15 pages.

(Continued)

*Primary Examiner* — Terrell McKinnon
*Assistant Examiner* — Steven Marsh
(74) *Attorney, Agent, or Firm* — Mark Croll; Patricia Chidiac; Beem Patent Law Firm

(57) ABSTRACT

A substrate-mountable holder system comprising: a first portion, a cover, an anchor and at least one fastener, the first portion having a hook extending therefrom and at least one opening for receiving the fastener(s), a cover configured to engage the first portion and hide the fastener(s). The first portion may include a lobe proximate the top of the rear surface to bias the bottom of the first portion toward the substrate to aid in more stable mounting of the first portion and further may include a tang projecting rearwardly from proximate the bottom for engagement with the substrate or a second fastener spaced proximate the first fastener to inhibit rotation of the system when installed. In addition, the first portion and the cover may have various features to fasten the cover securely to the first portion and provide the appearance of a unitary structure.

20 Claims, 5 Drawing Sheets

U.S. PATENT DOCUMENTS

| | | | |
|---|---|---|---|
| 5,308,203 | A | 5/1994 | McSherry et al. |
| 5,449,257 | A | 9/1995 | Chiannuzzi |
| 5,482,418 | A | 1/1996 | Giannuzzi |
| 5,507,464 | A | 4/1996 | Hamerski et al. |
| 5,529,449 | A | 6/1996 | McSherry et al. |
| 5,536,121 | A | 7/1996 | McSherry |
| 5,558,479 | A | 9/1996 | McElderry |
| 5,625,994 | A | 5/1997 | Giannuzzi |
| 5,692,864 | A | 12/1997 | Powell et al. |
| 5,752,792 | A | 5/1998 | McSherry |
| 5,833,415 | A | 11/1998 | McSherry |
| 5,882,162 | A | 3/1999 | Kaneko |
| 5,944,295 | A | 8/1999 | McSherry |
| 5,991,998 | A | 11/1999 | Kaneko |
| 6,079,921 | A | 6/2000 | Gauthier et al. |
| 6,095,465 | A | 8/2000 | Weck et al. |
| 6,139,236 | A | 10/2000 | Ito |
| 6,186,716 | B1 | 2/2001 | West et al. |
| 6,187,404 | B1 | 2/2001 | Schumann |
| 6,196,780 | B1 | 3/2001 | Wakai et al. |
| 6,224,030 | B1 * | 5/2001 | Hepworth ............... 248/215 |
| 6,250,597 | B1 | 6/2001 | Kuo |
| 6,250,865 | B1 | 6/2001 | McSherry |
| 6,354,779 | B1 | 3/2002 | West et al. |
| 6,382,892 | B1 | 5/2002 | Hempfling |
| 6,419,436 | B1 | 7/2002 | Gaudron |
| 6,629,680 | B2 * | 10/2003 | Weck et al. ............. 248/475.1 |
| 6,676,350 | B1 | 1/2004 | McSherry et al. |
| 6,830,228 | B2 | 12/2004 | Ernst |
| 7,070,022 | B1 | 7/2006 | Diggle, III et al. |
| 2004/0159766 | A1 | 8/2004 | Skorka |
| 2005/0006554 | A1 * | 1/2005 | DeLine ............... 248/475.1 |
| 2005/0079027 | A1 | 4/2005 | Ernst et al. |
| 2005/0084360 | A1 | 4/2005 | Panasik et al. |
| 2006/0024144 | A1 | 2/2006 | Ernst et al. |
| 2006/0249645 | A1 | 11/2006 | Price |
| 2007/0272819 | A1 | 11/2007 | Wang |
| 2008/0029665 | A1 | 2/2008 | Bauer |
| 2009/0212186 | A1 | 8/2009 | Wang |
| 2010/0219308 | A1 | 9/2010 | Ernst et al. |

FOREIGN PATENT DOCUMENTS

| | | | |
|---|---|---|---|
| DE | 295 02 052 | U | 3/1995 |
| DE | 295 09 487 | U | 3/1995 |
| DE | 9419144 | U1 | 3/1996 |
| DE | 093 01 098 | | 1/1997 |
| DE | 19 852 339 | | 5/2000 |
| DE | 20111693 | U1 | 5/2002 |
| DE | 20 2007 005649 | U1 | 4/2007 |
| EP | 0 951 869 | | 10/1999 |
| EP | 0 965 767 | | 12/1999 |
| EP | 1 004 781 | | 5/2000 |
| EP | 1 298 331 | A | 2/2003 |
| EP | 1 522 744 | | 4/2005 |
| FR | 439 431 | | 9/1996 |
| FR | 439 432 | | 9/1996 |
| GB | 1 041 247 | A | 9/1966 |
| GB | 1 487 032 | | 7/1975 |
| GB | 2 357 130 | A | 6/2001 |
| JP | 02005121224 | | 5/2005 |
| WO | WO/99/05420 | | 2/1999 |
| WO | WO/2004/053341 | | 6/2004 |
| WO | WO/2004/079209 | | 9/2004 |
| WO | WO/2004/079210 | | 9/2004 |
| WO | WO/2006/031421 | | 3/2006 |
| WO | WO/2006/013558 | | 12/2006 |
| WO | 2010098926 | | 9/2010 |

OTHER PUBLICATIONS

International Searching Authority (ISA), European Patent Office mailed PCT International Search Report for PCT/US 2006/020692 on Sep. 6, 2006, 4 pages.

International Searching Authority (ISA), European Patent Office mailed PCT International Search Report for PCT/US 2006/020693 on Oct. 24, 2006, 5 pages.

Ernst, U.S. Appl. No. 12/370,347, filed Feb. 12, 2009 entitled "Wall Mountable Holders".

3M, Metal Hooks, Feb. 24, 2009, 2 pages, website http://solutions.3m.com/wps/portal/3M/en_US/Command/home/us_en/products/metal_hooks/.

International Search Authority, European Patent Office (ISA/EP); International Search Report and Written Opinion of ISA for International Application PCT/US2010/022205; mailing date Apr. 23, 2010.

International Searching Authority (ISA/EP) PCT Notification of Transmittal, The International Search Report and the Written Opinion for International Application PCT/US2011/0022972; Mailing Date Aug. 1, 2011; 17 pages.

International Searching Authority (ISA), European Patent Office mailed PCT International Search Report for PCT/US 2004/032281 on Jan. 27, 2005, 2 pages.

* cited by examiner

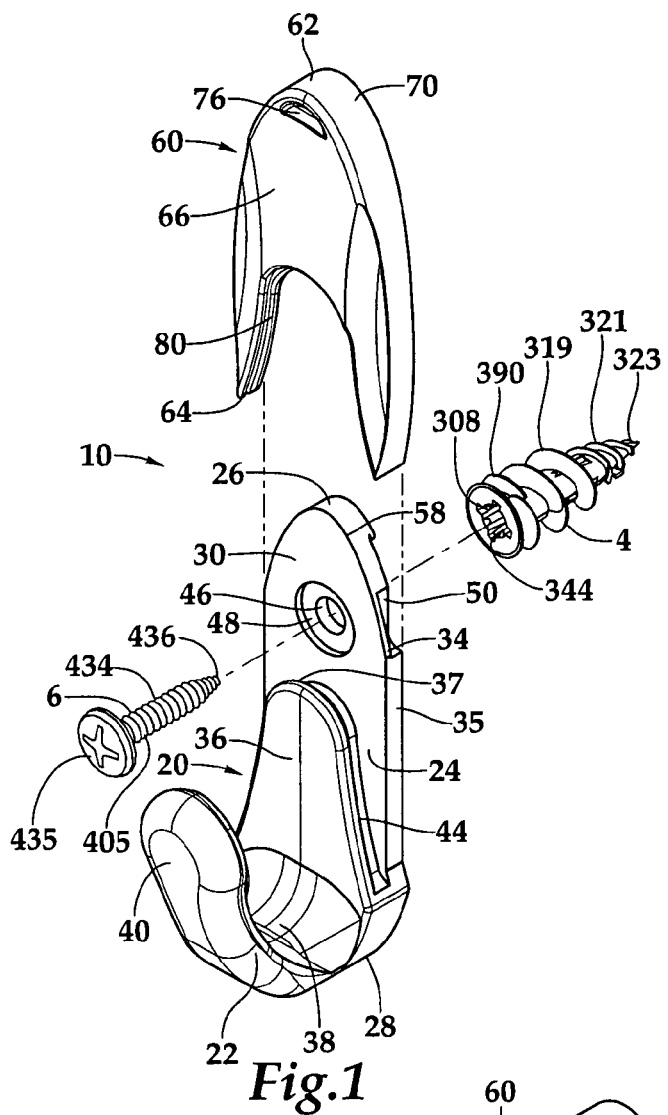

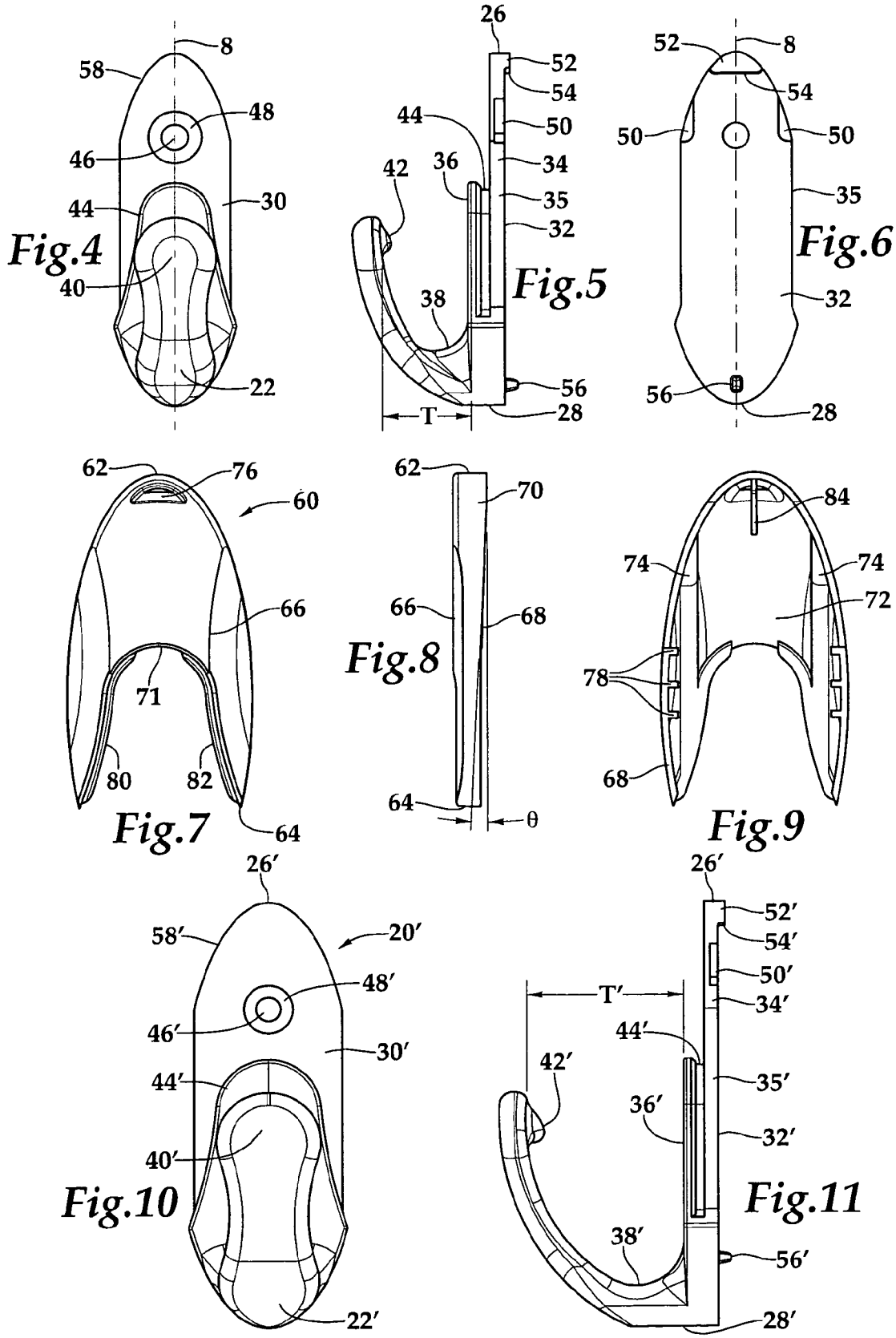

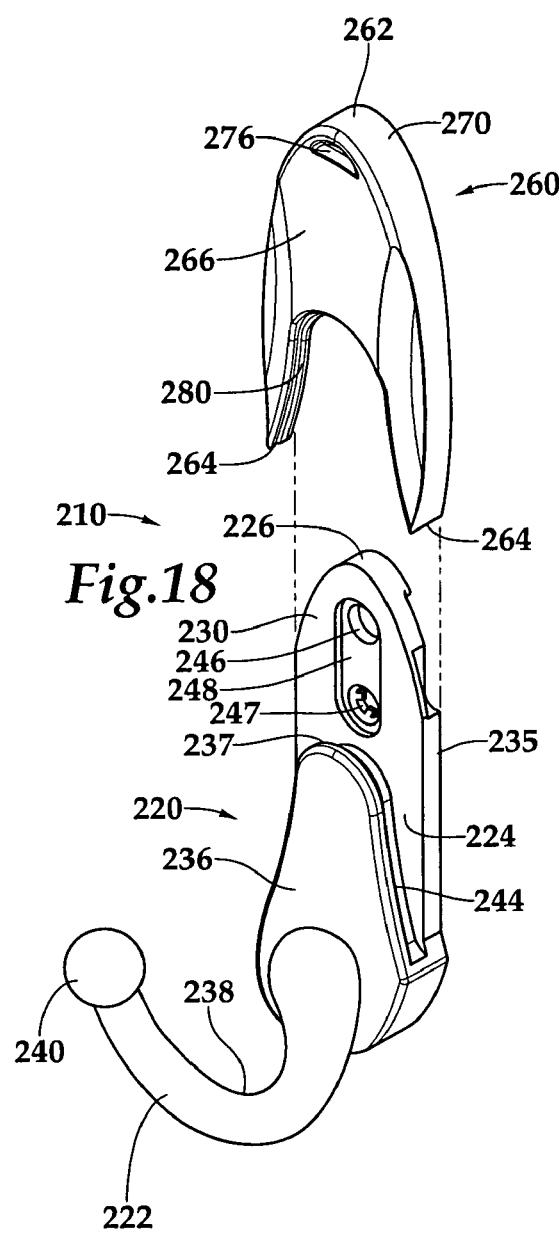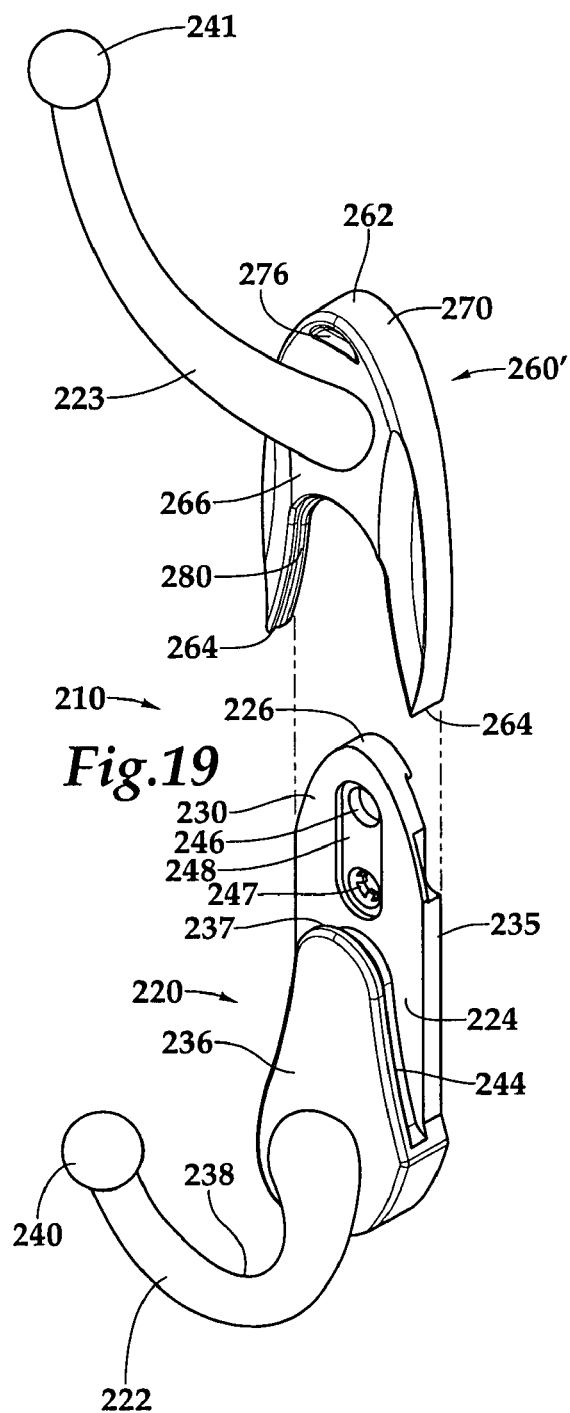

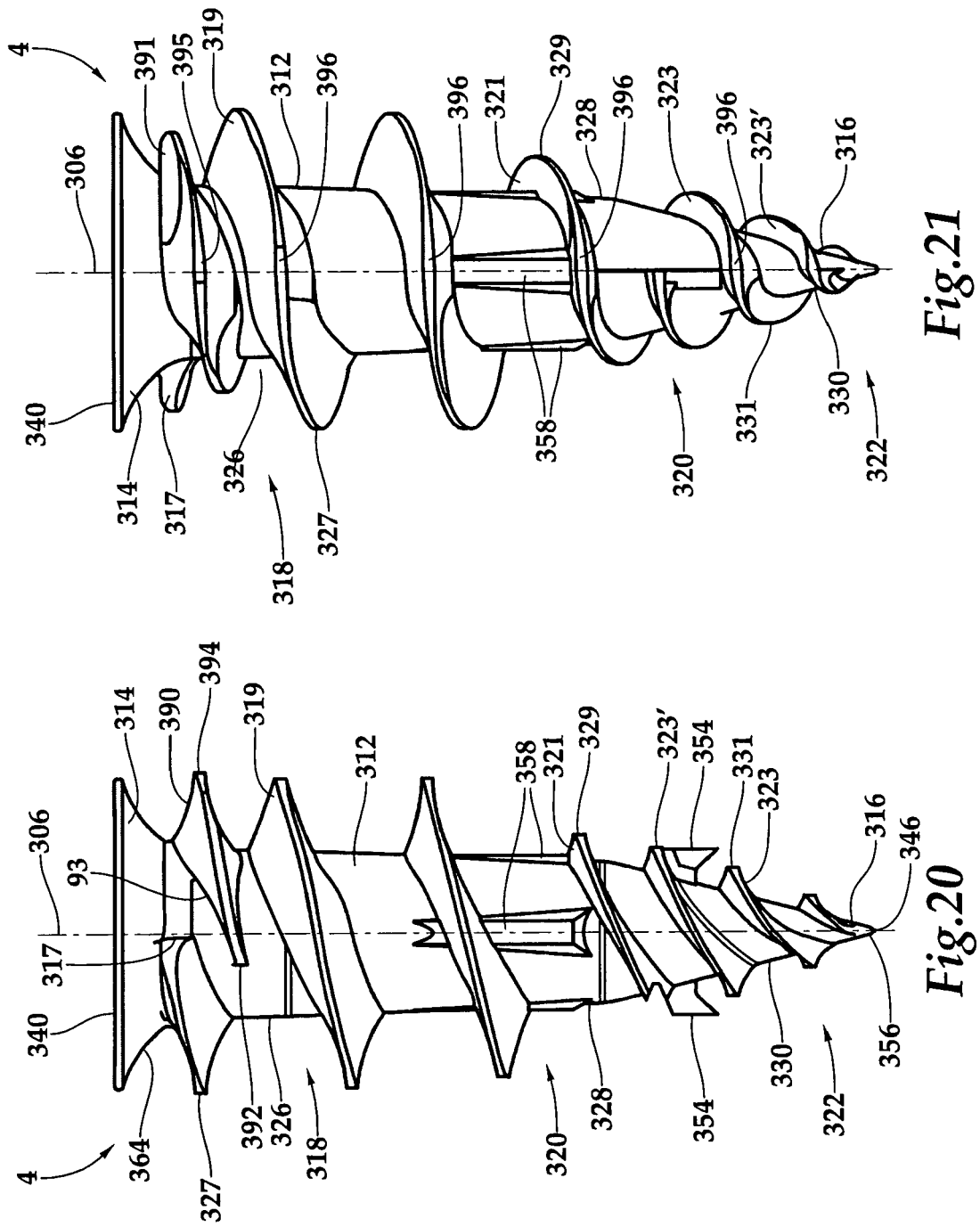

WALL MOUNTABLE HOLDER SYSTEM

BACKGROUND OF THE INVENTION

1. Field of the Invention

The present invention is directed to a wall mountable holder, mountable in a friable substrate such as drywall or on a semi-rigid material such as a hollow-core door, for holding objects such as household items, e.g., bags, robes, coats, etc.

2. Description of the Related Art

Wall mountable holders come in several varieties for different applications. One type of holder has an integrated screw protruding from a rear surface, the screw having relatively small root and major diameters. To install this holder, a user rotates the entire holder, driving the fastener into the mounting substrate. Unfortunately, when completely installed, the fastener may not be oriented properly and may require a partial turn to accomplish this orientation, either backing the holder out of the substrate, potentially weakening the holding strength of the holder, or embedding a non-threaded portion into the substrate, increasing stress on the holder and potentially causing the holder to fracture, deform or otherwise fail during installation. In addition, these holders generally are designed for use in rigid substrates such as exposed studs and perform poorly in friable substrates.

A second type of holder may include a base plate that is held in place on a wall while one or more sheet metal-type fasteners are driven into the substrate. As with the first variety of holder described above, this second type of holder often is not suitable for use in semi-rigid, friable or hollow substrate applications.

These first and second types of holders may be located so that the threaded portion or the fasteners, respectively, are located at a point overlying a stud. If long enough, these threaded portions may embed in the stud, thereby increasing the holder's holding strength. To accomplish this goal, however, pre-drilling into the stud may be required. In each case then, additional planning, tools and time would be required. In addition, some holders require one or more screws to be driven, but unless pilot holes are positioned, sized and pre-drilled with great care, efforts to drive screws can result in stripping of the drywall, thereby reducing holding strength.

A third type of holder is a generally one-piece design and relies on an adhesive backing to keep the holder in place. These holders may be used in a variety of locations, but their holding strength may be significantly less than that of the holders described above, even in friable substrate applications, due to the low holding strength of the adhesive. Additionally, adhesive installations require wall preparation and waiting time before mounting is complete and objects can be supported by the holder.

What is needed is a holder mountable to a friable substrate that may be installed easily for increased pullout resistance and load capacity.

BRIEF SUMMARY OF THE INVENTION

In one aspect of the invention, a substrate-mountable holder system, comprising: a first portion comprising a base having a first front surface and a second front surface, a rear surface, a top and a bottom, an opening for receiving an anchor protruding from the front surface to the rear surface proximate the top, a hook extending from proximate the bottom, a rearwardly facing tang extending from the rear surface proximate the bottom and a lobe extending from the rear surface proximate the top; and a second portion for operatively engaging the first portion so as to cover the first front surface. The second portion may have a front, wherein the second front surface of the first portion substantially aligns with the front of the second portion. The system may also include a self-drilling drywall anchor having a bore and a fastener for operatively engaging the first portion and the bore. In addition, the first portion also may have a recess between the first and second front surfaces and the second portion may have a tongue for operatively engaging this recess. Moreover, the system may include other features to attach the first portion to the cover, including: a notch on the rear surface with a corresponding ear on the cover for operatively engaging the notch; a generally axially aligned side on the first portion with a corresponding plurality of guides on the second portion; and/or an angled portion of the rear surface of the cover.

In another aspect of the invention, a substrate-mountable holder system may include: a first portion comprising a base having a first front surface, a second front surface, a rear surface, an upper end and a lower end, a plurality of openings protruding from the first front surface to the rear surface, a lobe extending rearwardly from the rear surface proximate the upper end and a hook extending from proximate the lower end; and a second portion for operatively engaging the first portion and covering the plurality of openings; a self-drilling drywall anchor and a plurality of fasteners. The system further may have a second leg, e.g., extending from at least one of the first portion and the second portion. In addition, at least two of the openings may be substantially horizontally aligned and generally centered along a width of the first portion. Moreover, at least one of the openings may include a plurality of splines. Additionally, the second portion may have a plurality of tongue components for operatively engaging a groove on the first portion, and the second portion also may have a gap between the tongue components, as well as a recess on a rear surface of the second portion.

In still another aspect of the invention, a substrate-mountable holder system may comprise: a first portion generally symmetrical about an axial plane comprising a generally oblong base with a hook extending outward from a bottom of the base, the hook having an upper end lower than an upper end of the second front surface; the first portion comprising a first front surface and a second front surface spaced outward a greater amount than the first front surface and further comprising a curved groove generally between, and substantially perpendicular to, the first and second front surfaces; the first front surface surrounding a recess extending into the base and an opening extending through the base; the base further having a plurality of notches in a rear surface and a plurality of generally axial sides; a second portion having a front surface substantially following a contour of the second front surface of the first portion; and the second portion further comprising a plurality of tongue components for operatively engaging the curved groove, a plurality of ears for operatively engaging the plurality of notches and a plurality of guides for operatively engaging the generally axial sides. The second portion further may include a notch in the front surface proximate a top of the second portion for aiding in removal of the second portion. In addition, the system may have a lobe protruding from a rear surface of the base proximate an upper end and a generally axially-aligned tang protruding from the rear surface proximate a lower end. Moreover, the lobe may have a thickness substantially equal to a thickness of the base at the first front surface.

These and other features and advantages are evident from the following description of the present invention, with reference to the accompanying drawings.

BRIEF DESCRIPTION OF THE SEVERAL VIEWS OF THE DRAWINGS

FIG. 1 is an exploded, perspective view of one embodiment of a holder system mountable to a variety of substrates for holding an object.

FIG. 2 is a reverse, perspective view of the base and cover portions of the holder system of FIG. 1.

FIG. 3 is a perspective view of the assembled holder system of FIG. 1.

FIG. 4 is a front view of a first portion of a holder.

FIG. 5 is a side view of the first portion of FIG. 4.

FIG. 6 is a rear view of the first portion of FIG. 4.

FIG. 7 is a front view of a cover of a holder.

FIG. 8 is a side view of the cover of FIG. 7.

FIG. 9 is a rear view of the cover of FIG. 7.

FIG. 10 is a front view of a second embodiment of a first portion of a holder.

FIG. 11 is a side view of the first portion of FIG. 10.

FIG. 18 is an exploded, perspective view of a first portion and cover of a fifth embodiment of a holder system.

FIG. 19 is an exploded, perspective view of a first portion and a second cover of the holder system of FIG. 18.

FIG. 20 is a side view of one type of self-drilling anchor used in a holder system mountable to a variety of substrates for holding an object.

FIG. 21 is a second side view of the anchor of FIG. 20, rotated 90 degrees from FIG. 20.

DETAILED DESCRIPTION

Figure 12:
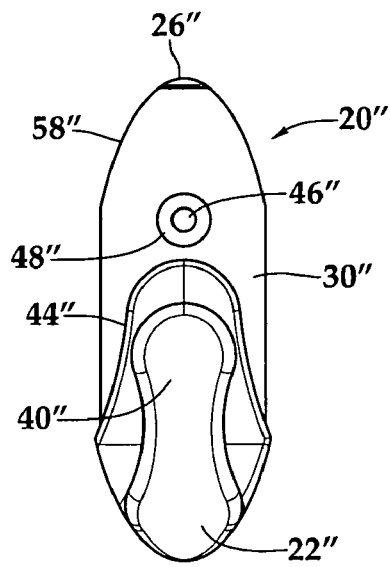
FIG. 12 is a front view of a third embodiment of a first portion of a holder.

In one embodiment, a hook system 10 for mounting to a substrate 2 may include a first portion 20, a second portion or cover 60, an anchor 4 and fastener 6, wherein the first and second portions may be substantially symmetrical about an axis or plane 8.

First Portion

First portion 20 may include a hook 22 extending from a base 24, the base 24 having a top 26, bottom 28, a first front surface 30, second front surface 36, rear surface 32 and sides 34. First front surface 30 and second front surface 36 may be generally planar and generally parallel to substrate 2. In addition, base 24 may be generally oblong and may have a height greater than a maximum width. Moreover, as seen in FIG. 1, first front surface 30 may have an opening 46 for receiving fastener 6.

Hook 22 may extend from bottom 28 of base 24 to form a throat between hook 22 and base 24. Bottom of hook 22 may extend generally perpendicular to rear surface 32 of base 24 and then turn to extend outward and upward. Similarly, bottom 38 of throat may roll downward and outward to allow for a larger spacing between hook 22 and base 24 while disguising the size of the opening, making hook 22 appear smaller. Hook 22 may extend to an enlarged end or bulb 40 that may be wider than a portion of hook 22 proximate bulb 40 in order to help retain objects on hook 22 and prevent them from becoming dislodged easily. To further aid in this function, hook 22 may have a button 42 protruding from an inward-facing surface of bulb 40, and button 42 may be shaped to retain items hung on hook, e.g., by having a broad bottom substantially perpendicular to mounting surface against which items may bear.

Turning to FIGS. 4-5, first portion 20 may have a groove 44 between first front surface 30 and second front surface 36. Groove 44 may be generally perpendicular to both surfaces and may extend along a portion of a perimeter of second front surface 36 and substantially across a width of base 24. The portion of the perimeter of second front surface 36 that generally tracks groove 44 may be parabolic or bell shaped, coming to a rounded apex at top 37 of second front surface 36.

First front surface 30 may have an opening 46 for receiving fastener 6. Opening 46 may be spaced between top 37 of second front surface 36 and top 26 of first front surface 30 and may be generally aligned on axis 8. Opening 46 may have a recess 48 for receiving a head of fastener 6 so that the underside of the head lays recessed with respect to first front surface 30, allowing for better engagement between first portion 20 and cover 60. Shear loading on hook 22 may be preferable than a bending moment component of an applied load since friable substrates have larger shear loading capacities as compared to bending moment capacities, and higher shear loading may be accomplished by increasing vertical spacing between applied load on hook 22 and fastener 6 in opening 46.

Turning now to FIG. 6, at least a portion of sides 34 may extend in a generally axial direction. This generally axial portion 35 of sides 34 may extend along a height of base 24, generally between opening 46 and bottom 38 of throat. Rear surface 32 of base 24 further may include one or more notches 50 proximate upper ends of generally axial portions 35 for receiving ears 74 (discussed below). Notches 50 may appear generally triangular when viewing rear surface 32.

During mounting, anchor 4 is driven into substrate 2, and fastener 6 is inserted through opening 46 and into bore of anchor 4. Oftentimes, a user will not drive a fastener level such that when the head of the fastener contacts the recess, the first portion likely will not be mounted flush with substrate 2, leading to poor engagement between the rear surface 32 and substrate 2.

It surprisingly was found that a raised lobe 52 protruding rearward from rear surface 32 may alleviate this situation. Raised lobe 52 may extend between an upper surface that generally is aligned with top 26 along arch 58 and a bottom 54 that may be generally normal to axis 8. Bottom 54 further may be spaced from opening 46 so that when anchor 4 is installed in substrate 2 and first portion 20 is located so as to align opening 46 with bore of anchor 4, there is a clearance between the head of anchor 4 and bottom 54. When fastener 6 is driven through opening 46, raised lobe 52 may contact substrate 2 first, causing first portion 20 to bear against substrate 2 and not anchor 4, biasing or camming rear surface 32 and slightly compressing bottom 28 against substrate 2. Preferably, lobe 52 is tall enough to cam bottom 28 of first portion 20 against substrate 2 but not so tall that if the installer over-installs fastener 6, they will distort first portion 20 to the point where cover 60 will not fit any longer. Lobe 52 may have a thickness less than or equal to the thickness of base 24 at a point just below bottom 54 of lobe 52, i.e., top 26 that includes lobe 52 may be about twice as thick as this lower portion. Preferably, lobe 52 may be between about 25% and about 100% of this base thickness, still more preferably between about 30% and about 50%. Alternatively, lobe 52 may be between about $10/1000''$ thick and about $1/10''$ thick, preferably between about $50/1000''$ and about $80/1000''$.

Staying with FIG. 6, rear surface 32 further may have a tang 56 aligned generally axially and protruding rearwardly. Tang 56 may be wedge-shaped, with a base having a thickness and coming to a point or line in order to allow tang 56 to be inserted into substrate 2. Tang 56 may cooperate with fastener 6 to provide two points of contact with substrate 2 so as to inhibit rotation of hook system 10. Although any two points on rear surface 32 should work, tang 56 preferably may be located proximate bottom 28 and generally aligned with axis 8. Since bottom 28 of rear surface 32 may be biased toward substrate 2 due to interaction of lobe 52 with substrate 2 and, conversely, portions of rear surface 32 higher up may be spaced further away from substrate 2 than bottom 28, placing tang 56 higher on rear surface 32 may otherwise require tang 56 be longer in order to ensure that tang 56 embeds in substrate 2, requiring more material to form first portion 20.

Cover

Turning to FIGS. 7-9, hook system 10 further may include a cover 60 having a top 62, bottom 64, front 66, back 68 and outer side 70 and inner side 71. Outer side 70 may be substantially arcuate to form a continuous surface from bottom 64 to top 62 and back to bottom 64. In addition, front 66 may include a notch 76 proximate top 62. Notch 76 may be used to assist in removing cover 60 from first portion 20, e.g., by accepting the head of a screwdriver to which an upward force may be applied. Cover 60 also may have a complementary support rib 84 on back 68 and generally aligned with axis 8. Support rib 84 may add additional strength to cover 60 to avoid damage when a force is applied to notch 76.

As can be seen in FIG. 9, back 68 of cover 60 further may have features for guiding cover 60 onto, and keeping cover 60 aligned with, first portion 20. For example, back 68 may be angled outward an amount θ with respect to axis 8 or substrate 2 from top 62 to bottom 64. Angle θ may be between about 1 degree and about 10 degrees, preferably between about 1 degree and about 5 degrees, still more preferably between about 1 degree and about 3 degrees, and in one embodiment about 2 degrees. This angling may compress top 62 of cover 60 against top 26 of first portion when cover 60 is installed. Additionally or alternatively, the angle may cause top 62 of cover 64 to extend rearwardly past rear surface 32 of first portion 20, covering lobe 52 from view once system 10 is installed.

In addition, cover 60 may include a tongue, which may be divided into first tongue component 80 and second tongue component 82 that operatively engage groove 44 on first portion 20. Cover 60 may include a space between first and second components 80, 82 to form a channel or recess 72. In the event that the head of fastener 6 does not lay flush with or below first front surface 30 but extends outward beyond first front surface 30, head of fastener 6 may pass through opening into recess 72 when cover 60 is placed over first portion 20.

Cover 60 additionally may include one or more ears 74 proximate top 62 of back 68. Ears 74 may be substantially symmetrically located on opposite sides of axis 8. In addition, ears 74 may be shaped substantially similarly to, or may be smaller than, notches 50 on first portion 20 to allow ears 74 to operatively engage notches 50 when cover 60 is placed on first portion 20. For example, comparing FIGS. 6 and 9, ears 74 are generally triangular and match the generally triangular shape of notches 50.

Staying with FIGS. 9, cover 60 further may have one or more guides 78 on each side of axis 8 for interfacing with generally axial portions 35 on first portion 20. Preferably, cover 60 has a plurality of guides 78, still more preferably about three guides 78, on each side of axis 8. In order to interface with generally axial portions 35, outer ends of guides 78 preferably are spaced substantially equidistantly from axis 8.

Anchor

Hook system 10 further may include a drywall anchor 4. Various types of anchors may be used with system 10, for example, anchors sold under the trademarks E-Z ANCOR, STUD SOLVER, MINI STUD SOLVER, TWIST-N-LOCK or TAP-N-LOCK, see commonly assigned U.S. Pat. No. 4,601,625 and U.S. patent application Ser. Nos. 10/844,706, 11/832,311 and 12/167,742 to Ernst, et al., the contents of which are incorporated herein by reference. Anchor 4 may be a self-drilling drywall anchor capable of penetrating studs, and may have the configuration shown in FIGS. 20 and 21.

For example, anchor 4 may having an elongated body 312 with an axis 306, an axial bore 308 adapted to receive an elongated mounting fastener 4, a flared end 314 having torque transmitting surfaces 315 therein, a proximal portion 318 proximate flared end 314, an intermediate portion 320, a distal portion 322, and a drilling tip 316 generally opposite flared end 314, wherein proximal portion 318 has a threaded exterior, such as drywall gripping threading 319, having a root 326, a crest 327 with a crest diameter DC, and a thread height DH, intermediate portion 20 has a threaded exterior, such as member gripping threading 321, having a root 328, a crest 329 with a crest diameter MC substantially smaller than drywall gripping threading crest diameter DC, and a thread height MH substantially smaller than drywall gripping thread height DH, and distal portion 322 has a threaded exterior, such as drilling threading 323, having a root 330 that tapers toward drilling tip 316, a crest 331 with a crest diameter TC substantially smaller than drywall gripping threading crest diameter DC, and a thread height TH substantially smaller than drywall gripping thread height DH.

In addition, anchor 4 may include splines 344 in bore 308 of anchor 4 for engaging with mounting fastener 6. Mounting fastener threading 405 taps mating threads 345 into splines 344 so that mounting fastener 6 is threadingly engaged with splines 344, and hence with anchor 4. Splines 344 also add structural support to anchor 4 so that body 312 of anchor 4 can withstand higher torsion forces when driven through drywall 2 and support member 5. Splines 344 may extend along a length of bore 308 and may preferably extend substantially along the entire length of bore 308.

Anchor 4 further may have an additional, tertiary thread 390 proximate flared end 314. Additional thread 390 may have a terminal end 391 circumferentially spaced from a terminal end 317 of proximal portion threading 319. Additional thread 390 further may have a leading end 392 generally circumferentially aligned with a terminal end 317 of proximal portion. Preferably, terminal end 391 of additional thread 390 may be offset from terminal end 317 of proximal portion threading 319 by between about 120 and about 240 degrees, preferably between about 150 and about 210 degrees, still more preferably about 180 degrees.

Offsetting additional thread 390 from proximal portion threading 319 means that a plurality of threads may be engaged in the substrate 2 when anchor is fully installed. Moreover, offsetting of threads may cause proximal portion threading 319 and additional thread 390 to be generally diametrically opposed such that, when installed, there is at least one diameter at which threads of anchor 4 engage substrate 2 on both sides of anchor 4, resulting in a more even distribution of force during loading and a stronger, more stable engagement of anchor 4. Without additional thread 390, when anchor 4 is installed in a thin substrate such as the face of a hollow core door, proximal portion threading 319 may either not engage face or may only engage face on one side of anchor 4, resulting in a weaker, less stable engagement and, subsequently, a lower holding strength.

The substrate 2 may be a friable material chosen from one of several friable materials used in construction. An example of the friable material is gypsum based drywall, such as the gypsum drywall sold under the trademark SHEETROCK by United States Gypsum. Drywall typically has a thickness T of ½ inch or ⅝ inch, but it can be obtained in other thicknesses, such as ⅜ inch.

Typically, friable materials such as drywall are mounted to a member, such as a wood structural support member, plywood, or another friable material, such as another layer of drywall. The member can be a support member, such as a wood support member, for example a 2×4 stud or the like, evenly spaced from other wood studs, e.g. every 16 inches, or a metal support member, such as a steel support stud. Support members are substantially more resistant to pullout than drywall because they are much less likely to break apart.

Alternatively, the substrate 2 may be a semi-rigid material. For example, it may be a thin piece of solid wood, fiberboard, plywood, or multiple materials having a veneer coating and may be, e.g., one side of a hollow core door. The semi-rigid material may come in a variety of thicknesses, but generally may be between about 1/16 inch and about ⅛ inch.

Fastener

Mounting fastener 6 is preferably a threaded fastener, such as a mounting screw, having an elongate shank 434 with a head 435 at one end and a tip 436 at the other. Shank 434 of mounting fastener 6 includes threading 405 which engages with interior bore 308 of anchor 4. Threading 405 of mounting fastener 6 can be of a standardized thread form, such as Unified Coarse (UNC) or Unified Fine (UNF) threading, or threading 405 can be of a specialized thread form. Mounting fastener 6 can be a standard #6, #7 or #8 UNC screw, wherein head 435 has a Phillips recess, and a total elongate length FL of between about ½ inch inches and about 2 inches or more, preferably about 1¼ inches. Mounting fastener 6 can have a thread density of between about 8 threads per inch and about 18 threads per inch, preferably about 15 threads per inch.

Various Sizes of First Portion and Cover

Hook system 10 may come in variety of sizes for multiple applications, e.g., small, medium and large sizes. Each variation may employ a similarly sized anchor 4 and fastener 6 but may have differently sized first portions 20 and covers 60. For example, a "small" first portion 20 may have a width between generally axial sides 35 of between about ½" and about 1", preferably between about ⅝" and about ⅞", still more preferably about ¾", and in one embodiment about 0.745". First portion 20 also may have a height between about 2" and about 3", preferably between about 2¼" and about 2¾", still more preferably about 2½", and in one embodiment, about 2.43". In addition, first portion may have a maximum throat width, T, of between about ⅜" and about 1", preferably between about ½ and about ¾", and in one embodiment about 0.52". Moreover, first portion may have a thickness from first front surface 30 to rear surface 32 of between about 1/16" and about 3/16", preferably between about 1/16" and about ⅛", and in one embodiment about 0.1" and further may have a thickness between first front surface 30 and rear surface of lobe 52 of between 3/32" and about ¼", preferably between about ⅛" and about 3/16", and in one embodiment about 0.157". Additionally, tang 56 may have a depth of between about 1/16" and about 3/16", preferably between about 1/16" and about ⅛", and in one embodiment about 0.92".

A "medium" version of system 10, for example, as seen in FIGS. 10-11, may include first portion 20' having a width between generally axial sides 35' of between about ¾" and about 1½", preferably between about ⅞" and about 1¼", still more preferably about 1", and in one embodiment about 1.076". First portion 20' also may have a height between about 2½" and about 3½", preferably between about 3" and about 3¼", still more preferably about 3⅛", and in one embodiment, about 3.18". In addition, first portion may have a maximum throat width, T, of between about ¾" and about 1½", preferably between about ⅞" and about 1⅛", and in one embodiment about 1.01". Moreover, similar to the "small" version, first portion 20' may have a thickness from first front surface 30' to rear surface 32' of between about 1/16" and about 3/16", preferably between about 1/16" and about ⅛", and in one embodiment about 0.1". First portion 20' further may have a thickness between first front surface 30' and rear surface of lobe 52' of between 3/32" and about ¼", preferably between about ⅛" and about 3/16", and in one embodiment about 0.164". Additionally, tang 56' may have a depth of between about 1/16" and about 3/16", preferably between about 1/16" and about ⅛", and in one embodiment about 0.92".

Figure 13:
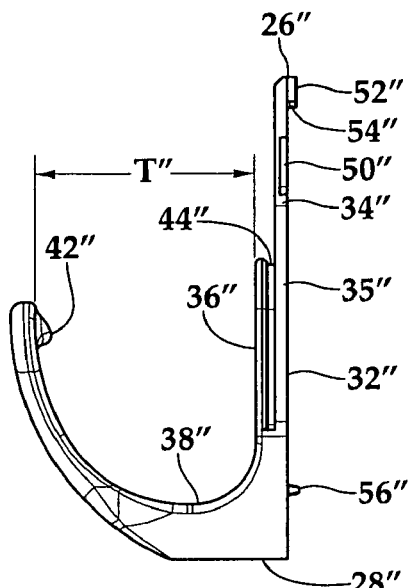
FIG. 13 is a side view of the first portion of FIG. 12.

A "large" version of system 10, e.g., as seen in FIGS. 12-13, may include first portion 20" having a width between generally axial sides 35" of between about 1" and about 1¾", preferably between about 1¼" and about 1½", still more preferably about 1 5/16", and in one embodiment about 1.318". First portion 20" also may have a height between about 3½" and about 4½", preferably between about 3¾" and about 4¼", still more preferably about 4", and in one embodiment, about 3.93". In addition, first portion 20" may have a maximum throat width, T, of between about 1¼" and about 2", preferably between about 1½" and about 1¾", and in one embodiment about 1.62". Moreover, similar to the "small" and "medium" versions, first portion 20" may have a thickness from first front surface 30" to rear surface 32" of between about 1/16" and about 3/16", preferably between about 1/16" and about ⅛", and in one embodiment about 0.1". First portion 20" further may have a thickness between first front surface 30" and rear surface of lobe 52" of between 3/32" and about ¼", preferably between about ⅛" and about 3/16", and in one embodiment about 0.183". Additionally, tang 56" may have a depth of between about 1/16" and about 3/16", preferably between about 1/16" and about ⅛", and in one embodiment about 0.92".

Single-bodied hooks that rely on an adhesive backing for engagement with a substrate such as drywall also may be produced in a variety of sizes. For small, medium and large versions of these hooks, holding strengths of about 1 lb., about 3 lb. and about 5 lb., respectively, have been claimed. While sizing of these hooks may not align identically with the various sizes of hook system 10 described above—e.g., a "large" adhesive-backed hook may be relatively comparable in size to the "medium" hook of FIGS. 10-11, each of the small, medium and large hooks of the present invention may have a holding strength of about 100 lbs., or significantly higher than the strength of the adhesive-backed hooks. In addition, the components of system 10, including first portion 20 and cover 60 may be fabricated in a variety of ways, including using die cast zinc or a zinc alloy such as Zamak 1 or 3 or injection molded plastic. Additionally or alternatively, first portion 20 may include an adhesive backing on rear surface 32 to support first portion 20 and cover 60 against substrate 2.

Second Embodiment

Turning to FIGS. 14-17, a second embodiment of hook system 110 is shown. Hook system 110 may be well-suited for applications where the substrate is not friable, e.g., when the system 110 is installed on one side of a hollow core door. However, hook system 110 remains useful for friable substrate applications also. Elements common to the first embodiment share the same reference numerals but include a 100s prefix.

Like the first embodiment, system 110 may comprise a first portion 120, a cover 160, an anchor 4 and a fastener 6. Unlike the first embodiment, system 110 also may include a second fastener 6. Cover 160 may be substantially similar to cover 60, including recess 172 in back 168, a plurality of ears 174 disposed on opposite sides on axis 8, a plurality of guides 178 also disposed on opposite sides of axis 8 and having ends generally vertically aligned, and tongue components 180, 182 for engaging a groove 144 in first portion 120.

Figure 14:
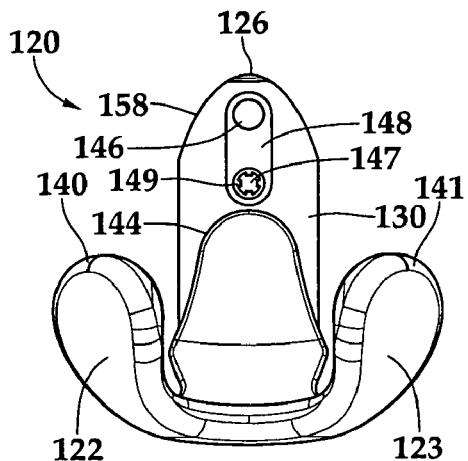
FIG. 14 is a front view of a fourth embodiment of a first portion of a holder.
Figure 15:
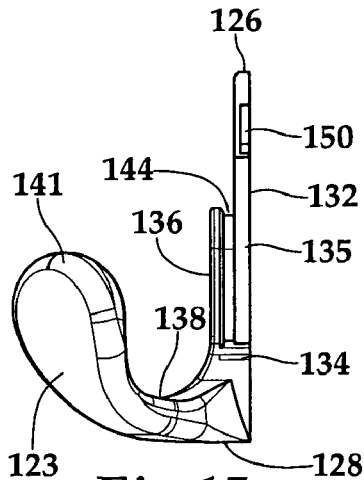
FIG. 15 is a side view of the first portion of FIG. 14.

As can be seen in FIG. 14, first portion 120 may include a plurality of hooks 122, 123 extending from bottom 128 of base 124. Hooks 122, 123 may extend away from base 124 at substantially symmetrical angles with respect to axial plane 108 so as to provide hooks for hanging multiple articles or to provide increased surface area to hang a larger or bulkier item such as a robe, e.g. Portions of hooks 122, 123 proximate bottom 128 of base 124 may be narrower than similar portions in the first embodiment so as to make room for both hooks. However, due to their separation from each other, and in order to support larger items, bulbs 140, 141 of hooks 122, 123 may be larger than bulb 40, i.e., generally semicircular but with a larger diameter.

Staying with FIG. 14, first front surface 130 of first portion may include a plurality of fastener openings 146, 147. Openings 146, 147 may be generally axially aligned and vertically disposed from one another. In addition, recess 148 may be expanded to form a channel that envelopes both openings. Openings 146 and 147 may be sized so as to accept similarly-sized fasteners 6, although outside diameter of openings may not be the same. Upper opening 146 may be generally circular to allow for free passage of fastener 6 into bore 308 of anchor 4. In addition, upper opening 146 may be spaced from top 126 of first portion 120 by a large enough distance so that first portion 120 conceals head of anchor 4 when system 110 is assembled. For example, center of upper opening 146 may be about ¼" from top 126, preferably slightly more than about ¼", i.e., about 0.26" in one embodiment.

Lower opening 147 may include splines 149 to meter fastener 6 into substrate 2, so as to provide positive engagement with substrate 2. Openings 146, 147 may be spaced far enough apart to allow for clearance between heads of fasteners and to provide clearance for the head or flange of anchor 4. Preferably, centers of openings 146, 147 may be between about ¼" and about ½" apart, preferably between about ⅓" and about ½" apart, and in one embodiment, about 0.45" apart. In addition, opening 146 may have a diameter between about ⅛" and about ¼", preferably between about ⅛" and about 3/16", and in one embodiment, about 0.177". Opening 147 may also have an outer diameter between about ⅛" and about 3/16", and in one embodiment, about 0.15". Moreover, opening 147 may have an inner diameter due to splines 149 of between about 1/16" and about ⅛", preferably between about 3/32" and about ⅛", and in one embodiment, about 0.108".

Figure 16:
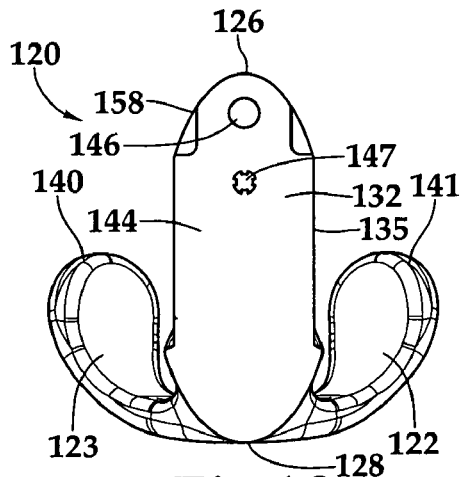
FIG. 16 is a rear view of the first portion of FIG. 14.
Figure 17:
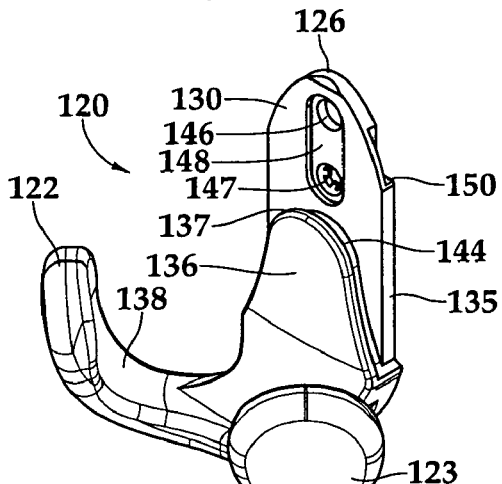
FIG. 17 is a perspective view of the first portion of FIG. 14.

Turning to FIG. 16, because first portion 120 includes openings for multiple fasteners, rear surface 132 may not include several of the features included in the first embodiment for orienting first portion 20. For example, rear surface 132 may be generally planar, with the exception of notches 150 for receiving ears 174. As such, rear surface 132 may not include a raised lobe or a tang, which features may not provide any added benefit in non-friable substrate applications because substrate may be too dense to accept lobe or tang. In those cases, a lobe and/or tang may impede rear surface 132 from contacting substrate 2, preventing rear surface 132 from mounting flush to substrate 2.

Third Embodiment

Turning now to FIGS. 18-19, a third embodiment of the hook system is shown. As with the second embodiment, elements common to the first embodiment share the same reference numerals but here include a 200s prefix.

In this embodiment, hook system 210, like system 110, may include a first portion 220, a cover 260, an anchor 4 and a plurality of fasteners 6. First portion 220 may include a first front surface 230 substantially similar to first front surface 130, including a plurality of generally axially aligned, spaced apart openings 247, 249 within a channel 248. First portion 220 further may a plurality of generally vertical sides 235 for interfacing with a plurality of support ribs 284 on cover 260, a groove 44 for operatively engaging a tongue, such as first and second tongue components 280, 282 on cover 260, and a plurality of notches 250 for operatively engaging a corresponding plurality of ears 274, also on cover 260.

Unlike the second embodiment, instead of projecting outwardly and upwardly from base 224 at bottom 228, hook 222 of the third embodiment may extend downwardly and outwardly from base 224, before turning upward to a distal end 239 having a bulb or knob 240. Knob 240 may be substantially vertically aligned with end of hook 222 proximate base 224 but also may extend higher or lower.

In this embodiment, a plurality of interchangeable covers 260 may be supplied, which may provide system 210 with greater functionality. For example, a first cover 260 that is similar in shape to covers 60, 160, i.e., substantially unadorned may be applied. In this configuration, system 210 may be particularly well suited to serve as a key holder or hat hook. Alternatively, system 210 may include a second cover 260' similar to cover 260 but with an additional hook 223 extending therefrom. Hook 223 may be generally axially aligned and extend outward and/or upward from cover 260' to a distal end extending beyond distal end of hook 222. As such, system 210 may allow for the hanging of multiple objects, e.g., as both a key holder and a wardrobe hook system.

Method of Use

Each of the holder systems 10, 10', 10", 10'", 110 and 210 may be used by a method including the steps of selecting a location on a substrate 2, driving anchor 4 into substrate 2 and, if present, into support behind substrate 2, positioning the holder against the wall or ceiling at the selected position such that opening 46 is substantially aligned with bore of anchor 4, aligning fastener 6 with opening 46, inserting fastener 6 through opening 46 and into bore, rotating fastener 6 in a clockwise direction so that fastener 6 engages anchor 4, pressing on said first portion 20 to cause the rearwardly projecting tang 56, if present, to puncture the surface of the substrate 2 and extend a short distance into the substrate 2, continuing to rotate fastener 6 until lobe 52 biases bottom 28 of first portion toward substrate and fastener head engages recess 48. The method may also include the step of inserting another fastener 6 into second opening 147, and driving the fastener through second opening, to be metered by engagement with splines 149, until fastener head abuts base plate. In some instances, e.g., when fastening into a very hard substrate, e.g., masonite, a small pilot hole may sometimes be drilled before the second fastener is self-metered into place. In addition, the method may include aligning cover 60 with first portion 20 and sliding cover 60 onto first portion to cover or disguise the appearance of fastener(s) 6, so that first and second tongue components 80, 82 operatively engage groove 44, ears 74 operatively engage notches 50 and/or guides 78 operatively engage generally axial sides 35.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A substrate-mountable holder system, comprising:
a first portion comprising a base having a first front surface and a second front surface, a rear surface, a top and a bottom, an opening for receiving a fastener protruding from the first front surface to the rear surface proximate the top, a hook extending from proximate the bottom, a rearwardly facing tang extending from the rear surface proximate the bottom and a lobe extending from the rear surface proximate the top; and
a second portion for operatively engaging the first portion so as to cover the first front surface.

2. A holder system according to claim 1, said second portion having a front, wherein said second front surface of said first portion substantially aligns with said front of said second portion.

3. A holder system according to claim 1, further comprising:
a self-drilling drywall anchor having a bore and a fastener for operatively engaging said first portion and said bore.

4. A holder system according to claim 1, said first portion further comprising a recess between said first front surface and said second front surface, and said second portion further comprising a tongue for operatively engaging said recess.

5. A holder system according to claim 1, said first portion further comprising a notch on said rear surface, and said second portion further comprising an ear for operatively engaging said notch.

6. A holder system according to claim 1, said first portion further comprising a generally axially aligned side, and said second portion further comprising a plurality of guides for operatively engaging said generally axially aligned side.

7. A holder system according to claim 1, wherein said second portion has a top, a bottom and a back, and a portion of said back angles inwardly in a direction from said top to said bottom.

8. A substrate-mountable holder system, comprising:
a first portion comprising a base having a first front surface, a second front surface,
an upper end and a lower end, a rear surface extending substantially between said upper end and said lower end, wherein said rear surface is configured to be disposed against a substrate, a plurality of openings protruding from the first front surface to the rear surface, a lobe extending rearwardly from the rear surface proximate the upper end and a hook extending from proximate the lower end; and
a second portion for operatively engaging the first portion and covering the plurality of openings.

9. A holder system according to claim 8, further comprising:
a self-drilling drywall anchor and a plurality of fasteners.

10. A holder system according to claim 8, further comprising a second leg extending from at least one of the first portion and the second portion.

11. A holder system according to claim 8, wherein at least two of said plurality of openings are substantially horizontally aligned and are generally centered along a width of said first portion.

12. A holder system according to claim 8, wherein at least one of said plurality of openings comprises a plurality of splines.

13. A holder system according to claim 8, further comprising a recess in said first front surface surrounding said plurality of openings.

14. A holder system according to claim 8, further comprising a plurality of tongue components on said second portion for operatively engaging a groove on said first portion, said second portion further comprising a gap between said tongue components and a recess on a rear surface of said second portion.

15. A holder system according to claim 8, further comprising at least one of:
a recess between said first front surface and said second front surface, said second portion further comprising a tongue for operatively engaging said recess;
a notch on said rear surface, said second portion further comprising an ear for operatively engaging said notch; and
a generally axially aligned side, said second portion further comprising a plurality of guides for operatively engaging said generally axially aligned side.

16. A substrate-mountable holder system, comprising:
a first portion generally symmetrical about an axial plane comprising a generally oblong base with a hook extending outward from a bottom of said base,
said first portion comprising a first front surface and a second front surface spaced outward a greater amount than said first front surface and further comprising a curved groove generally between, and substantially perpendicular to, said first and second front surfaces; said first front surface surrounding a recess extending into said base and an opening extending through said base;
said base further having a plurality of notches in a rear surface and a plurality of generally axial sides;
a second portion having a front surface substantially following a contour of said second front surface of said first portion; and
said second portion further comprising a plurality of tongue components for operatively engaging said curved groove, a plurality of ears for operatively engaging said plurality of notches and a plurality of guides for operatively engaging said generally axial sides.

17. A holder system according to claim 16, wherein said hook has an upper end lower than an upper end of said second front surface.

18. A holder system according to claim 16, said second portion further comprising a notch in said front surface proximate a top of said second portion.

19. A holder system according to claim 16, further comprising a lobe protruding from a rear surface of said base proximate an upper end of said base and a generally axially-aligned tang protruding from said rear surface proximate a lower end of said base.

20. A holder system according to claim 19, wherein said lobe has a thickness substantially equal to a thickness of said base at said first front surface.

* * * * *